(12) United States Patent
Nieuwoudt et al.

(10) Patent No.: US 10,792,592 B2
(45) Date of Patent: Oct. 6, 2020

(54) INLET DEVICE FOR SEPARATING PHASES OF A LIQUID STREAM IN A VESSEL AND METHOD INVOLVING SAME

(71) Applicant: KOCH-GLITSCH, LP, Wichita, KS (US)

(72) Inventors: Izak Nieuwoudt, Wichita, KS (US); Charles A. Griesel, Wichita, KS (US)

(73) Assignee: KOCH-GLITSCH, LP, Wichita, KS (US)

( * ) Notice: Subject to any disclaimer, the term of this patent is extended or adjusted under 35 U.S.C. 154(b) by 383 days.

(21) Appl. No.: 15/948,843

(22) Filed: Apr. 9, 2018

(65) Prior Publication Data
US 2018/0296945 A1    Oct. 18, 2018

Related U.S. Application Data

(60) Provisional application No. 62/484,460, filed on Apr. 12, 2017.

(51) Int. Cl.
*B01D 19/00* (2006.01)
*B01D 3/00* (2006.01)

(52) U.S. Cl.
CPC ......... *B01D 19/0057* (2013.01); *B01D 3/008* (2013.01)

(58) Field of Classification Search
CPC ............................ B01D 19/0057; B01D 3/008
See application file for complete search history.

(56) References Cited

U.S. PATENT DOCUMENTS

| | | |
|---|---|---|
| 3,731,467 A | 5/1973 | Jennings |
| 7,594,942 B2 | 9/2009 | Polderman |
| 8,025,718 B2 | 9/2011 | Kooijman |
| 2004/0130041 A1* | 7/2004 | Resetarits ............... B01D 3/22 261/79.2 |
| 2009/0139192 A1* | 6/2009 | Sams ..................... B01D 45/12 55/418 |
| 2012/0175792 A1 | 7/2012 | Nieuwoudt |
| 2013/0139689 A1 | 6/2013 | Schook |

(Continued)

FOREIGN PATENT DOCUMENTS

| | | |
|---|---|---|
| CN | 106512484 A | 3/2017 |
| RU | 2397001 C2 | 8/2010 |

(Continued)

OTHER PUBLICATIONS

International Search Report and Written Opinion for corresponding PCT Application No. PCT/IB2018/052458, dated Jul. 25, 2018, 11 pages.

*Primary Examiner* — Cabrena Holecek

(57) ABSTRACT

An inlet device for use in a vessel to facilitate separation of a gas phase from a liquid phase in a fluid stream. The inlet device has separation cans positioned at each of the outlet ends of a flow channel. Each separation can has a cylindrical wall and an elongated inlet opening in the cylindrical wall to allow the fluid stream to be introduced in a tangential direction into an open interior region where it swirls to facilitate separation of the gas phase from the liquid phase in the fluid stream. The liquid phase exits the separation can through slots in the cylindrical wall and through an open lower end of the open interior region. The gas phase exits the separation can by ascending upwardly through an open upper end of the open interior region.

20 Claims, 13 Drawing Sheets

(56) References Cited

U.S. PATENT DOCUMENTS

2013/0312376 A1 11/2013 Huff et al.
2015/0217211 A1 8/2015 Swanborn
2016/0008741 A1 1/2016 Beg et al.
2016/0288019 A1 10/2016 Ernst et al.

FOREIGN PATENT DOCUMENTS

| RU | 165691 U1 | 10/2016 |
| SU | 1247067 A1 | 7/1986 |
| WO | WO2004089498 A3 | 11/2004 |
| WO | 2012096935 A2 | 7/2012 |

* cited by examiner

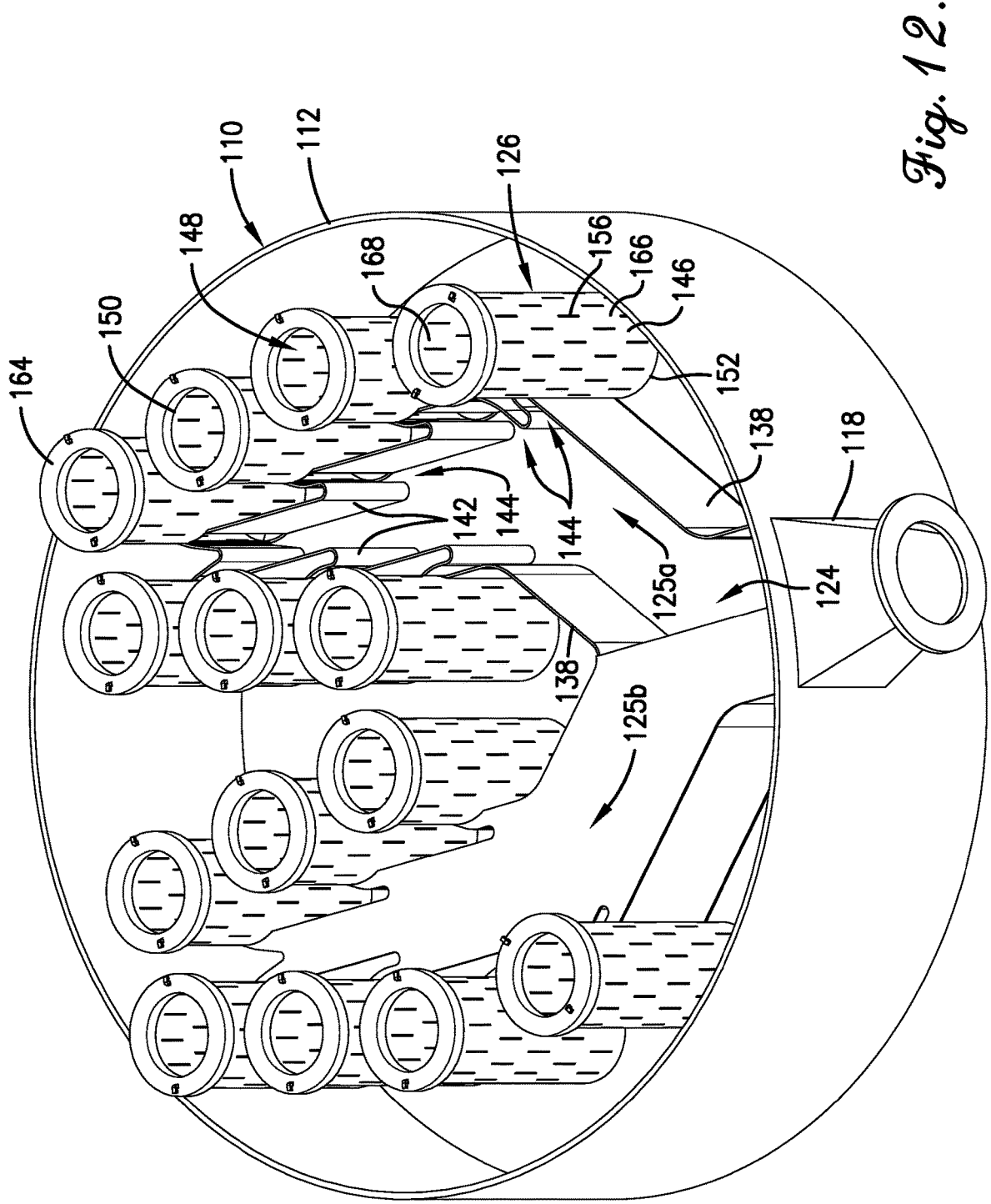

INLET DEVICE FOR SEPARATING PHASES OF A LIQUID STREAM IN A VESSEL AND METHOD INVOLVING SAME

CROSS REFERENCE TO RELATED APPLICATIONS

This present application claims priority to U.S. Provisional Patent Application No. 62/484,460 filed Apr. 12, 2017 the disclosures of which are incorporated by reference herein.

BACKGROUND OF THE INVENTION

The present invention relates generally to vessels in which a gas phase is to be separated from a liquid phase in a fluid stream and, more particularly, to an inlet device for facilitating such separation and a method of using the inlet device to effect some separation of the gas phase from the liquid phase in the fluid stream.

In many industrial processes, a fluid stream comprising a gas phase and a liquid phase is introduced into a vessel in which it is desirable to effect at least some separation of the gas phase from the liquid phase. Inlet devices of various types have been used to facilitate the separation of the phases. One type of inlet device uses one or more cyclones in which the fluid stream rotates or swirls to cause the heavier liquid phase to be flung against the cyclone wall and then flow downwardly to exit the open lower end of the cyclone. The lighter gas phase flows downwardly within the cyclone to the inlet of a center gas pipe, which is positioned above the lower end of the cyclone and below where the fluid stream is introduced into the cyclone. The gas pipe extends upwardly through the otherwise closed upper end of the cyclone so that the gas phase is able to ascend and then exit the cyclone after entering the center gas pipe. In order to prevent the gas phase from exiting the open lower end of the cyclone, the lower end is normally submerged in liquid to create a static head of liquid that resists against the breakout of the gas phase. If the static head of liquid is insufficient, the gas phase is able to exit through the open lower end of the cyclone, which causes an undesired entrainment of liquid within the gas flow. A need has thus developed for an improved inlet device in which there is less opportunity for undesired entrainment of liquid in the separated gas flow.

SUMMARY OF THE INVENTION

In one aspect, the present invention is directed to an inlet device for separating a gas phase from a liquid phase in a fluid stream when introduced radially into a vessel. The inlet device comprises a flow channel having an inlet end where the fluid stream enters the flow channel and outlet ends where separate portions of the fluid stream exit the flow channel, the outlet ends being spaced from the inlet end, and a separation can position at each of the outlet ends of the flow channel. Each of the separation cans comprises a cylindrical wall having an inner surface and an outer surface and forming an open interior region that is open at opposite upper and lower ends, an elongated inlet opening in the cylindrical wall and positioned adjacent one of the outlet ends of the flow channel to allow one of the portions of the fluid stream when it exits the outlet end of the flow channel to pass tangentially through the inlet opening in the cylindrical wall into the open interior region where it rotates or swirls within the open interior region to facilitate separation of the gas phase from the liquid phase in the fluid stream, and slots formed in the cylindrical wall to allow some of the liquid phase of the fluid stream when rotating or swirling within the open interior region to pass outwardly through the slots and exit the separation can while the separated gas phase flows upwardly and exits the separation can through the open upper end of the open interior region.

In another aspect, the present invention is directed to a vessel comprising a shell, an internal region defined by the shell, a radial feed nozzle in the shell, and an inlet device as described above that is positioned within the internal region and aligned with the radial inlet.

In a further aspect, the present invention is directed to a method of separating a gas phase from a liquid phase in a fluid stream using an inlet device as described above. The method comprises the steps of flowing the fluid stream within the flow channel from the inlet end to the outlet ends, delivering separate portions of the fluid stream from the outlet ends to the separation cans through the inlet openings in the cylindrical walls of the separation cans, causing the separate portions of the fluid stream to rotate or swirl within the open interior regions so that a centrifugal force that results from the swirling of the separate portions of the fluid stream causes the liquid phase in the separate portions of the fluid stream to impact against the inner surfaces of the cylindrical walls and the gas phase to separate from the liquid phase and ascend upwardly, removing the liquid phase from the inner surfaces of the cylindrical walls through the slots in the cylindrical walls and through the open lower ends of the open interior regions, and removing the ascending gas phase through the open upper ends of the open interior regions.

BRIEF DESCRIPTION OF THE DRAWINGS

In the accompany drawings that form part of the specification and in which like reference numerals are used to indicate like components in the various views:

FIG. 12 is a fragmentary view similar to that shown in FIG. 9, but with a portion of an upper plate of the inlet device broken away.

DETAILED DESCRIPTION

Figure 1:
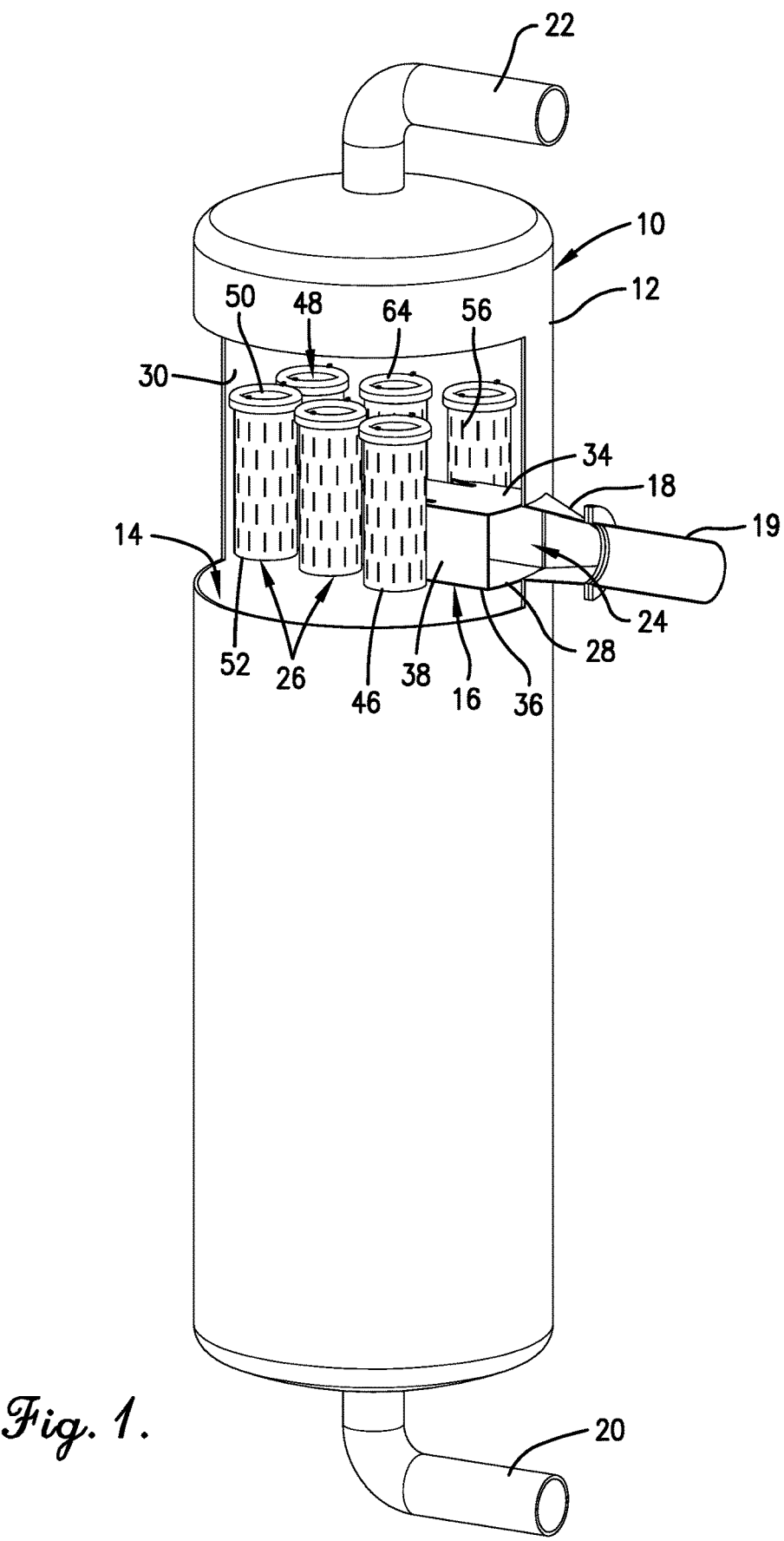
FIG. 1 is a fragmentary, perspective view of a vessel in which a portion of a shell of the vessel is broken away to show an inlet device in accordance with one embodiment of the present invention.
Figure 2:
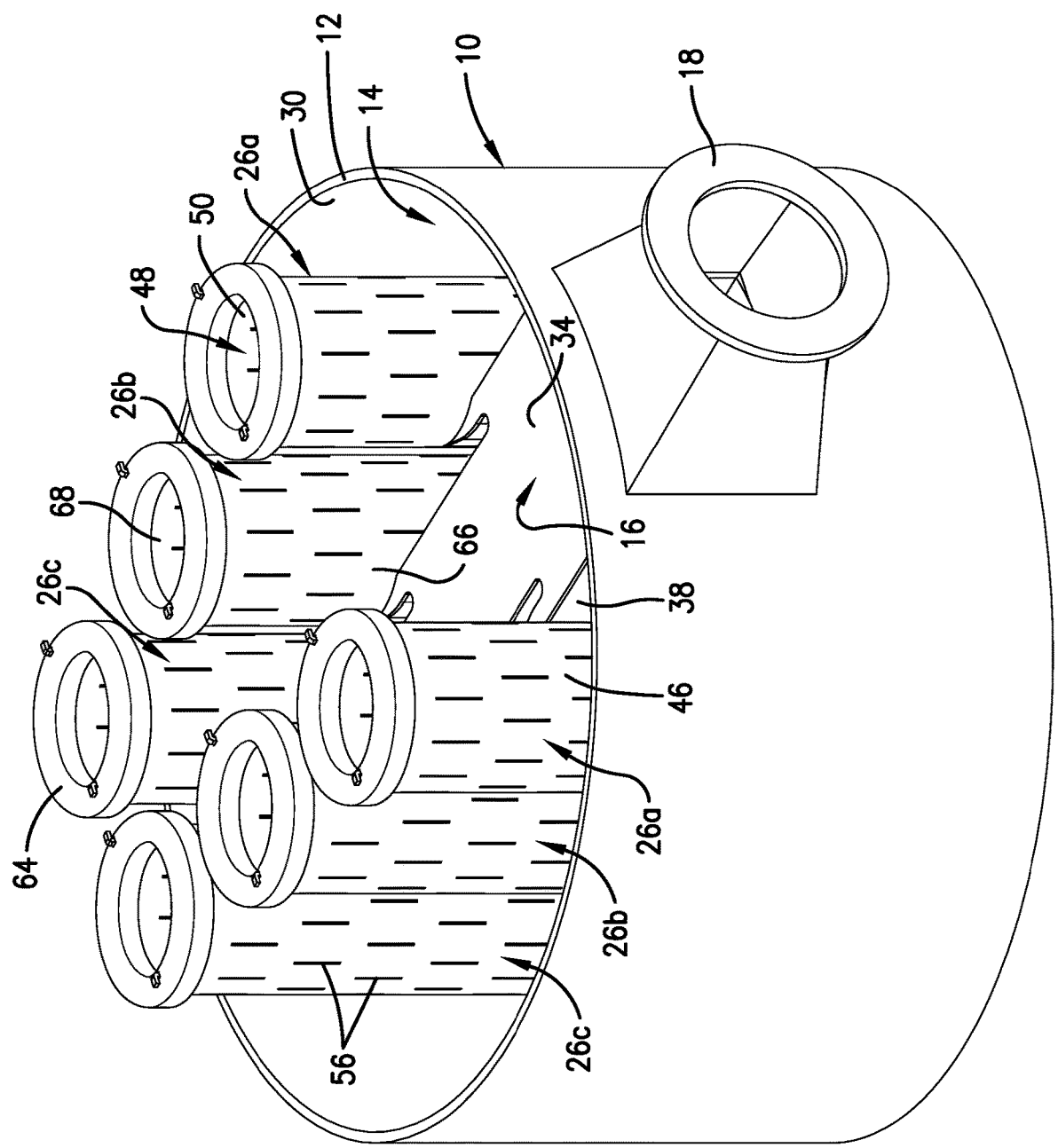
FIG. 2 is an enlarged, fragmentary view of a portion of the vessel shown in FIG. 1 and showing the inlet device from a different perspective than shown in FIG. 1.

Turning now to the drawings in greater detail and initially to FIG. 1, a vessel suitable for use in separation, mass transfer or heat exchange processes is represented generally by the numeral 10. The vessel 10 may include an upright or horizontal external shell 12 that may be generally cylindrical in configuration, although other configurations, including polygonal, are possible and are within the scope of the present invention. The shell 12 may be of any suitable diameter and height or length and may be constructed from one or more rigid materials that are desirably inert to, or are otherwise compatible with, the fluids and conditions present during operation of the vessel 10.

The vessel 10 may be of a type used for separating or processing fluid streams, typically liquid or vapor streams, into heavier and lighter fractions and/or to obtain fractionation products or to otherwise cause mass transfer or heat exchange between the fluid streams. For example, the vessel 10 may be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, or other processes occur.

The shell 12 of the vessel 10 defines an open internal region 14 within which an inlet device 16 of the present invention is positioned to receive a fluid stream that enters the vessel 10 through a feed nozzle 18. The feed nozzle 18 is normally a radial feed nozzle and is connected to a feed line 19. The feed nozzle 18 may include a transition from a circular cross section of the feed line 19 to a square or rectilinear cross section. The vessel 10 may include other nozzles and lines, such as a lower takeoff line 20 for removing a liquid or heavier phase and an upper takeoff line 22 for removing a gas or lighter phase from the internal region 14 of the vessel 10.

Other components of the vessel 10 that may be present, such as reflux stream lines, reboilers, condensers, vapor horns, liquid distributors, and the like, are not illustrated in the figures because they are conventional in nature and an illustration of these components is not believed to be necessary for an understanding of the present invention.

Turning additionally to FIGS. 2-7, the inlet device 16 extends horizontally within the internal region 14 and is positioned in alignment with the feed nozzle 18. The inlet device 16 comprises a flow channel 24 (FIGS. 4-7) and a plurality of separation cans 26 (e.g., 26a, 26b, 26c) that are connected to and are in fluid communication with the flow channel 24. Separation cans 26a, 26b and 26c are arranged on opposite sides of the flow channel 24. The flow channel 24 has an inlet end 28 where the fluid stream enters the flow channel 24. The inlet end 28 abuts an inner surface 30 of the shell 12. The flow channel 24 includes a plurality of outlet ends 32 (e.g., 32a, 32b, and 32c) that are spaced in a downstream flow direction from the inlet end 28.

The flow channel 24 is formed by an upper plate 34, a lower plate 36, two side walls 38, and an end wall 40 that are interconnected to form a generally box-shaped plenum. Each of the side walls 38 comprises individual divider segments 42 (e.g., 42a, 42b, and 42c) that extend in the direction of the flow of the fluid stream when it enters the inlet device 16 through the inlet end 28. The first divider segment 42a of each of the two sidewalls 38 extends from the shell 12 to the first separation can 26a that is positioned closest to the inlet end 28 of the flow channel 24. The second divider segment 42b extends between the first separation can 26a and the second separation can 26b. The third divider segments 42c similarly extends from the second separation can 26b to the third separation can 26c. The divider segments 42a, 42b, and 42c are in a staggered relationship to each other so that the flow channel 24 has a progressively narrower width in the direction of flow of the fluid stream. The divider segments 42b and 42c each have a U-shaped leading edge that is inwardly spaced from and overlaps a trailing portion of the adjacent, upstream divider segments 42a and 42b, respectively. The end wall 40 has a similar U-shaped leading edge that is inwardly spaced from and overlaps a trailing portion of the divider segments 42c. This arrangement of the divider segments 42a, 42b, and 42c and the end wall 40 creates sub-passageways 44a, 44b, and 44c that respectively lead to the outlet ends 32a, 32b, and 32c and the separation cans 26a, 26b, and 26c. In one embodiment, the sub-passageways 44a, 44b, and 44c are of generally equal cross-sectional area so that the fluid stream may be divided into roughly equal portions for flow through each of the sub-passageways 44a, 44b, and 44c. While a total of six separations cans 26a, 26b, and 26c have been shown, it is to be understood that a greater number of separation cans or fewer separation cans may be used.

Figure 5:
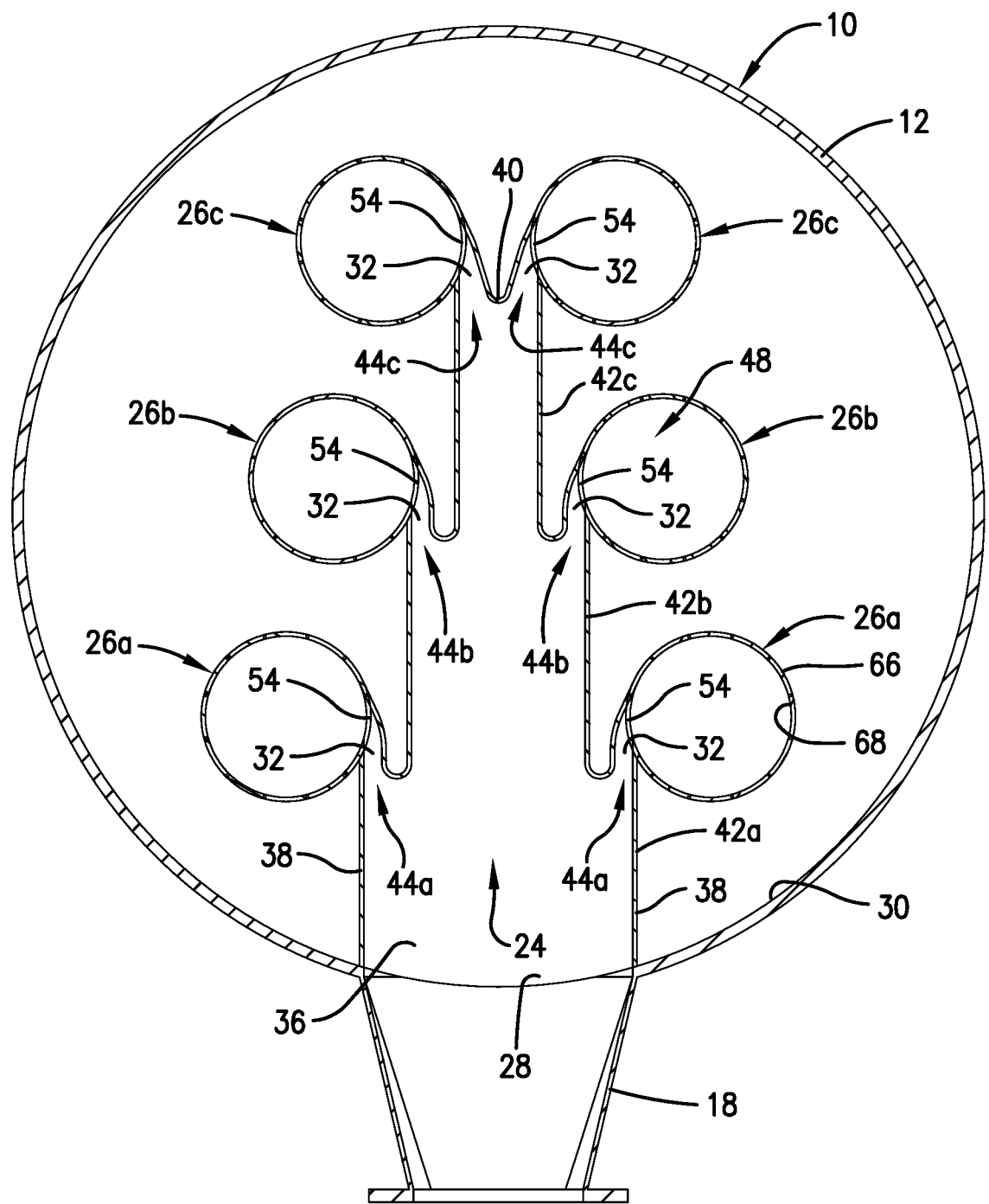
FIG. 5 is a top plan view of the portion of the vessel and inlet device shown in FIGS. 2-4 and taken in horizontal section.
Figure 5A:
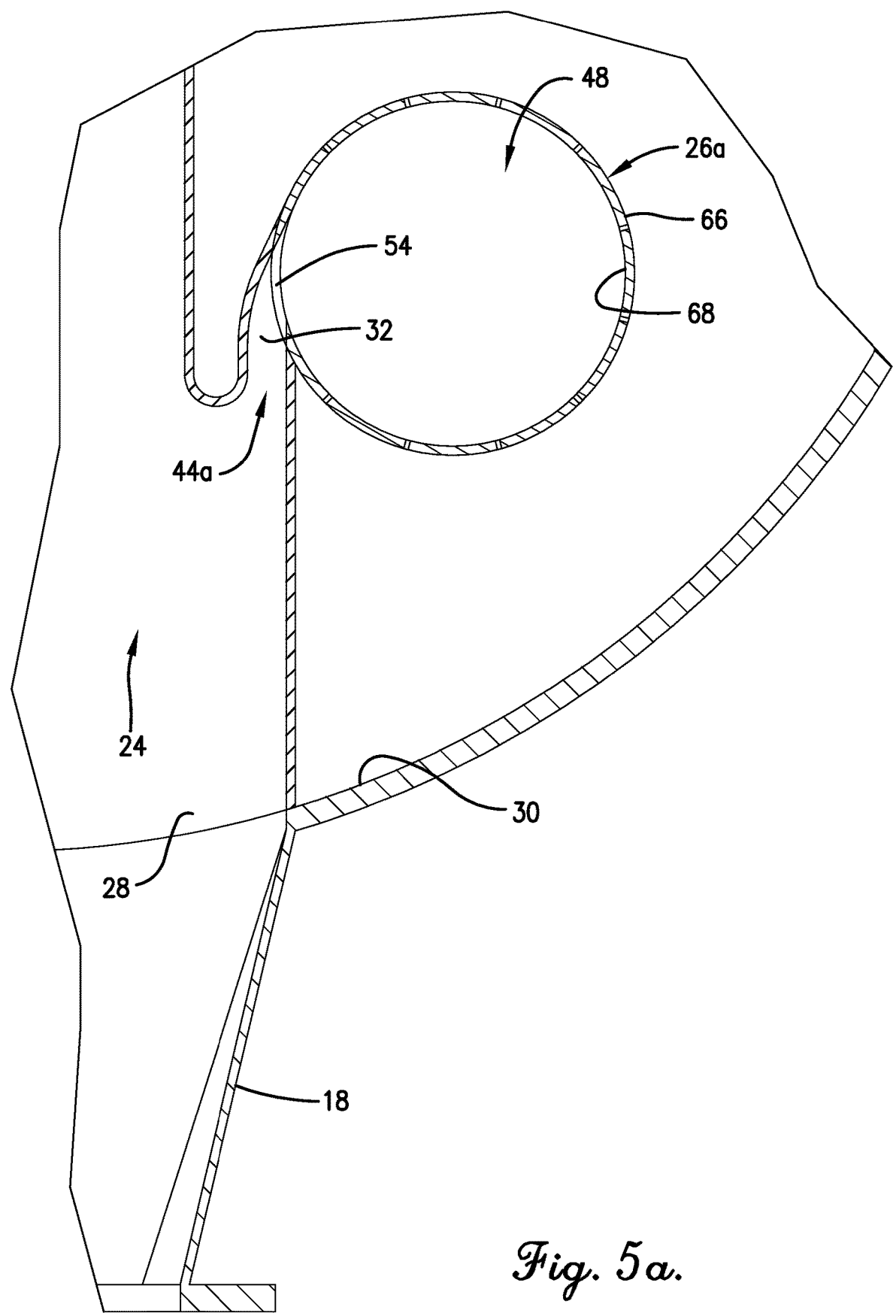
FIG. 5a is a top plan view of a portion of the vessel and inlet device as shown in FIG. 5, but on an enlarged scale.
Figure 6:
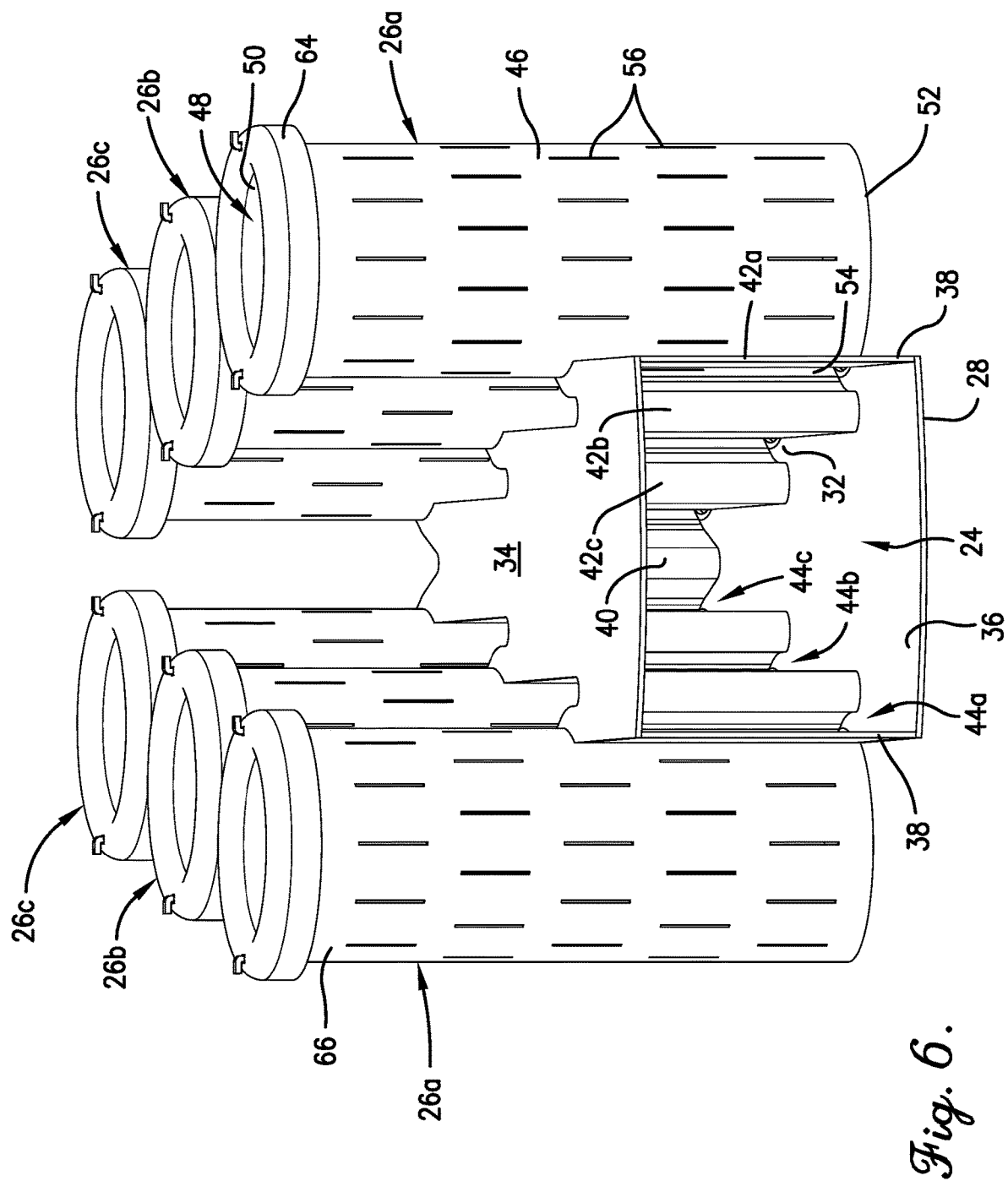
FIG. 6 is a perspective view of the inlet device of FIGS. 1-5.

Each of the separation cans 26a, 26b, and 26c is open at its top and bottom and comprises a wall 46 that is normally cylindrical and forms an open interior region 48 that is open at opposite upper and lower ends 50 and 52, respectively. A vertically-elongated inlet opening 54 (FIGS. 5 and 5a) is formed in the cylindrical wall 46 and is positioned adjacent and in alignment with the outlet end 32a, 32b, or 32c of the flow channel 24 so that the portion of the fluid stream flowing through the sub-passageway 44a, 44b, or 44c exits the outlet end 32a, 32b, or 32c and passes into the separation can 26a, 26b, or 26c through the inlet opening 54 along a flow path that is tangential to the cylindrical wall 46. As a result of this tangential flow path, the fluid stream rotates or swirls within the open interior region 48 within the separation can 26a, 26b, or 26c to facilitate a separation of some or all of the gas phase from the liquid phase in the fluid stream, thereby creating a heavier fraction and a lighter fraction of the fluid stream. In one embodiment, the inlet opening 54 has a height that is less than that of the cylindrical wall 46 and is at least partially positioned in a lower portion of the cylindrical wall 46. As one example, the inlet opening 54 has a height that is between 25 and 75% or between 40 and 60% of the height of the cylindrical wall 46. The inlet opening 54 may extend upwardly from near the lower end of the cylindrical wall 46.

Slots 56 are positioned in spaced apart relationship in the cylindrical wall 46 to allow some of the liquid phase in the fluid stream when swirling within the open interior region 48 to pass outwardly through the slots 56 and exit the separation can 26a, 26b, or 26c while the separated gas phase flows upwardly and exits the separation can 26a, 26b, or 26c through the open upper end 50 of the open interior region 48. The slots 56 are normally placed in a uniform pattern along substantially the entire height and circumference of the cylindrical wall 46. In one embodiment, the slots 56 are arranged in a number of circumferential rows that are vertically spaced apart. Each of the slots 56 may be vertically-elongated with a height that is much greater than its width, e.g. the height is 10, 20, 30 or more times the width.

Figure 8:
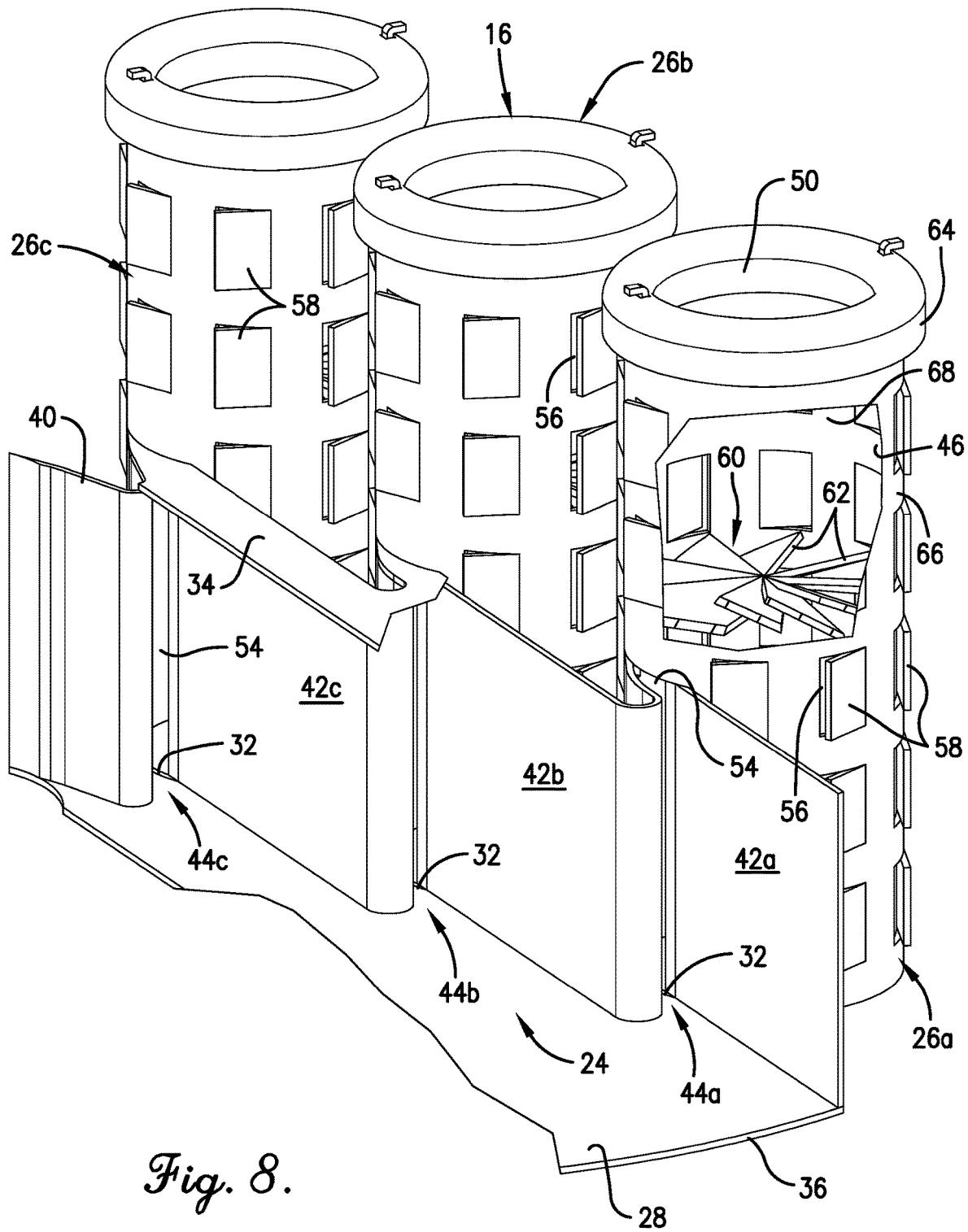
FIG. 8 is a fragmentary view similar to that shown in FIG. 7, but showing a second embodiment of the inlet device employing a different separation can.
Figure 9:
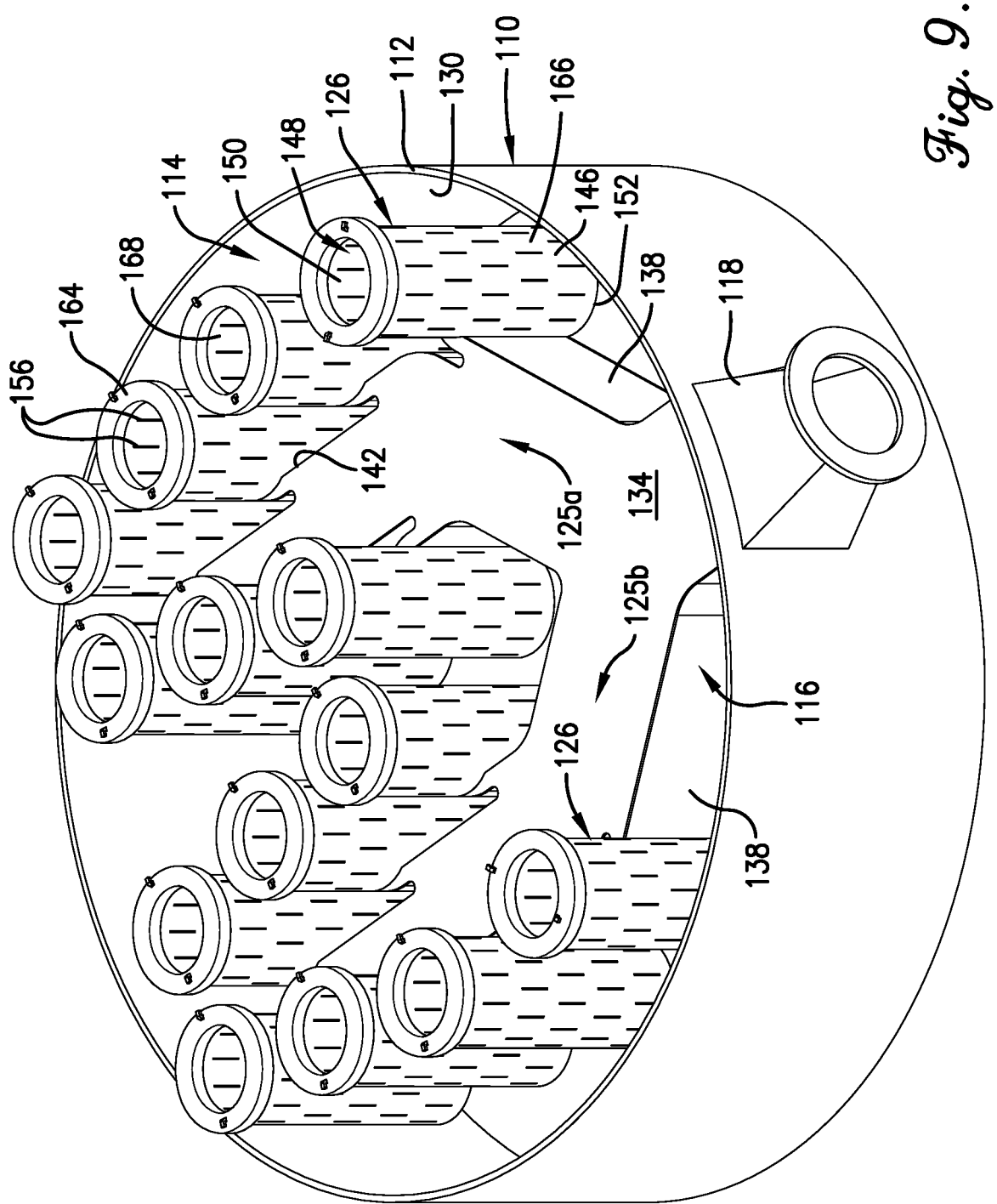
FIG. 9 is a fragmentary view of a portion of a vessel in which a third embodiment of the inlet device is installed.
Figure 10:
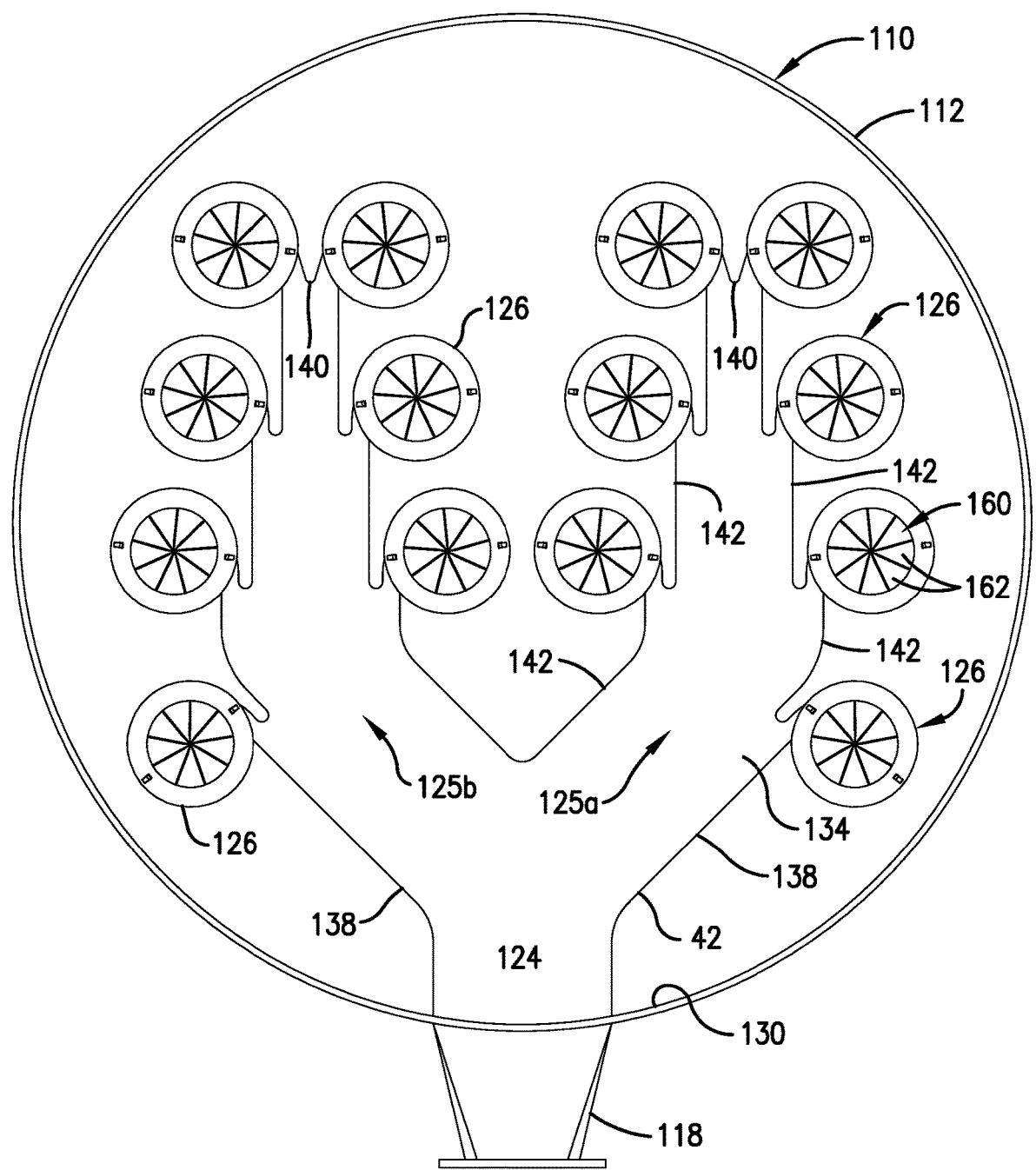
FIG. 10 is a top plan view of the portion of the vessel and inlet device shown in FIG. 9.
Figure 11:
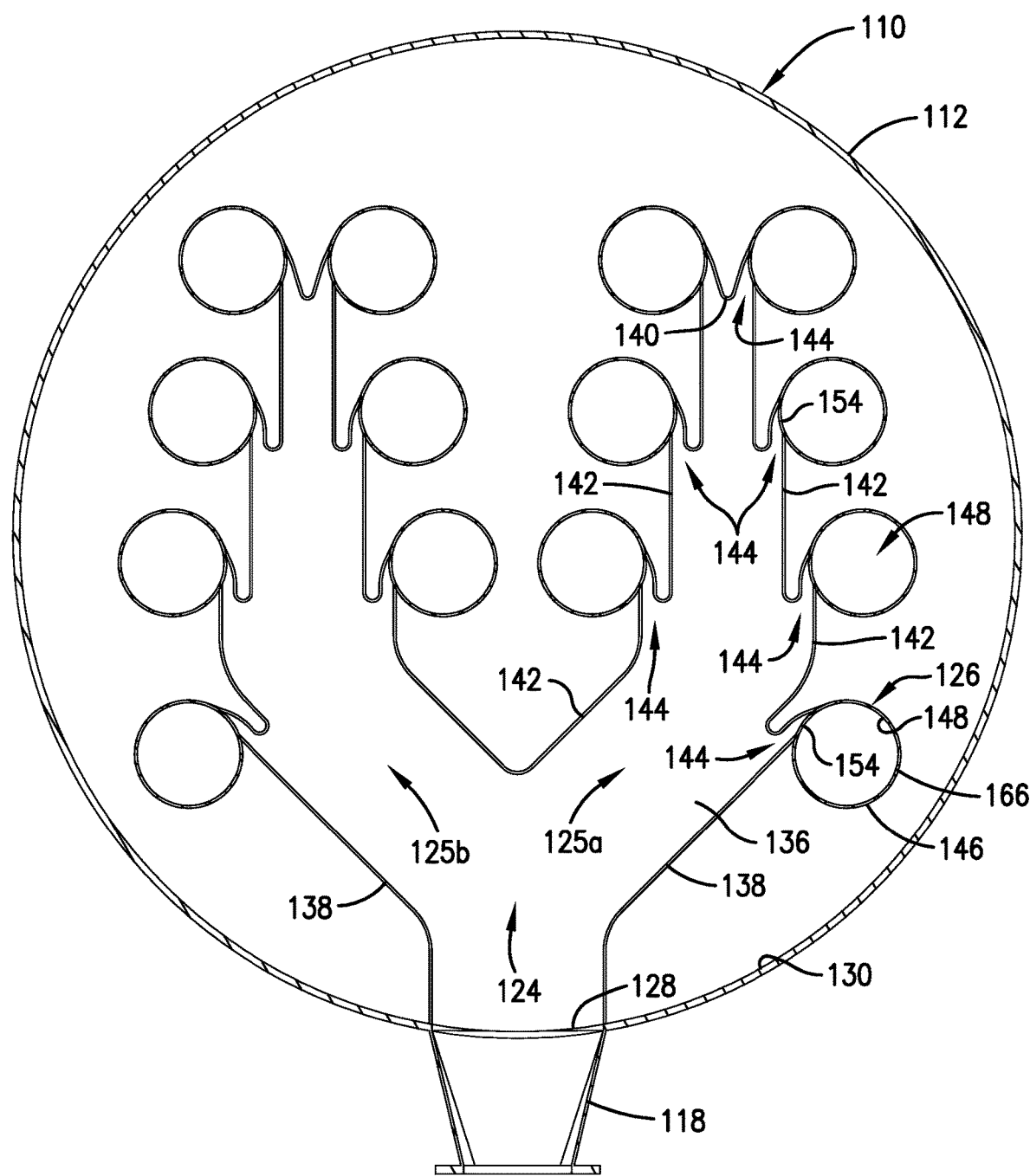
FIG. 11 is a top plan view of the vessel and inlet device shown in FIGS. 9 and 10 and taken in horizontal section.

In the embodiment shown in FIG. 8, the slots 56 include tabs 58 that are bent outwardly from a leading edge that is positioned upstream in relation to the rotational direction of liquid flow within the cylindrical wall 46.

Figure 3:
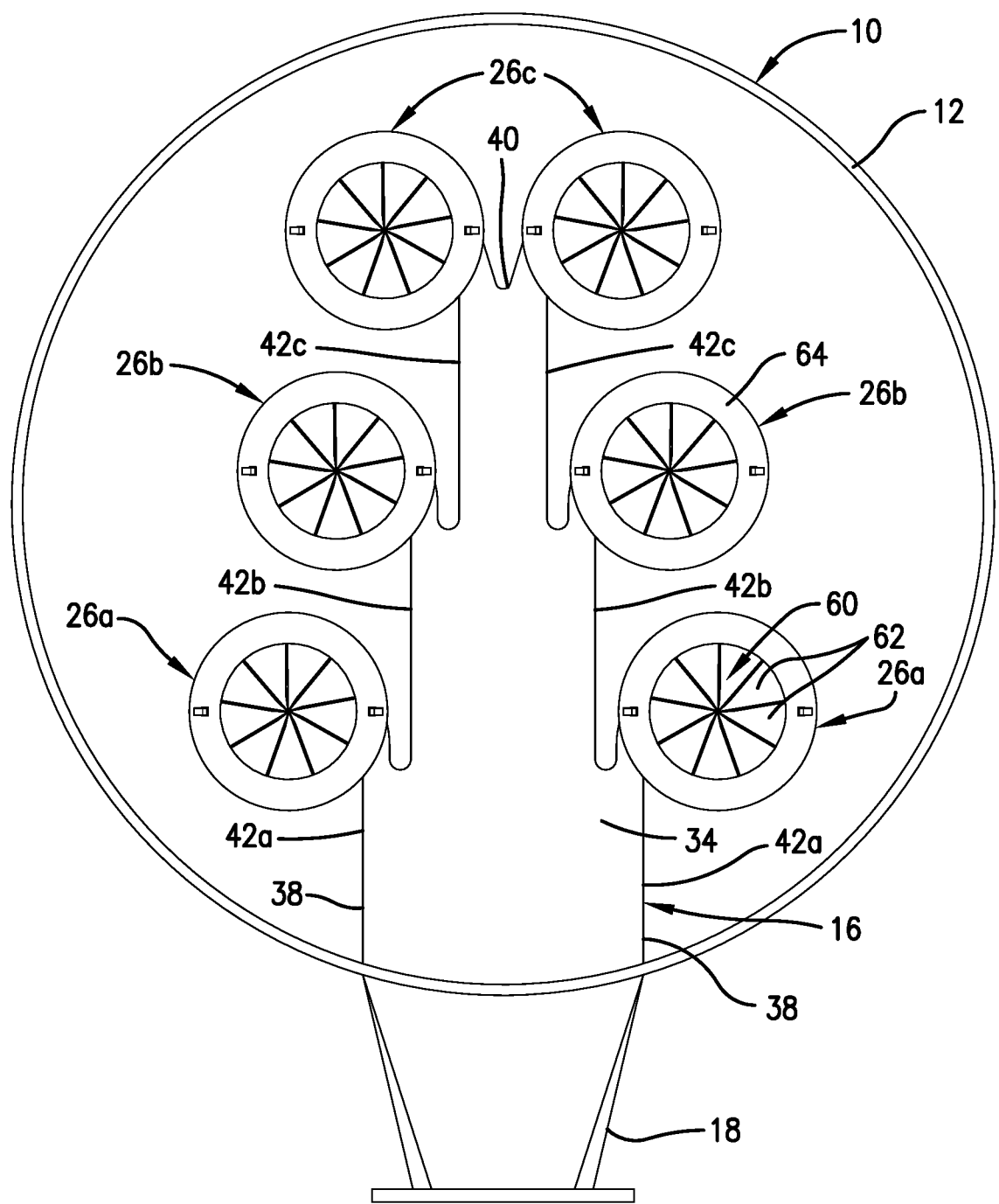
FIG. 3 is a top plan view of the portion of the vessel shown in FIG. 2.
Figure 4:
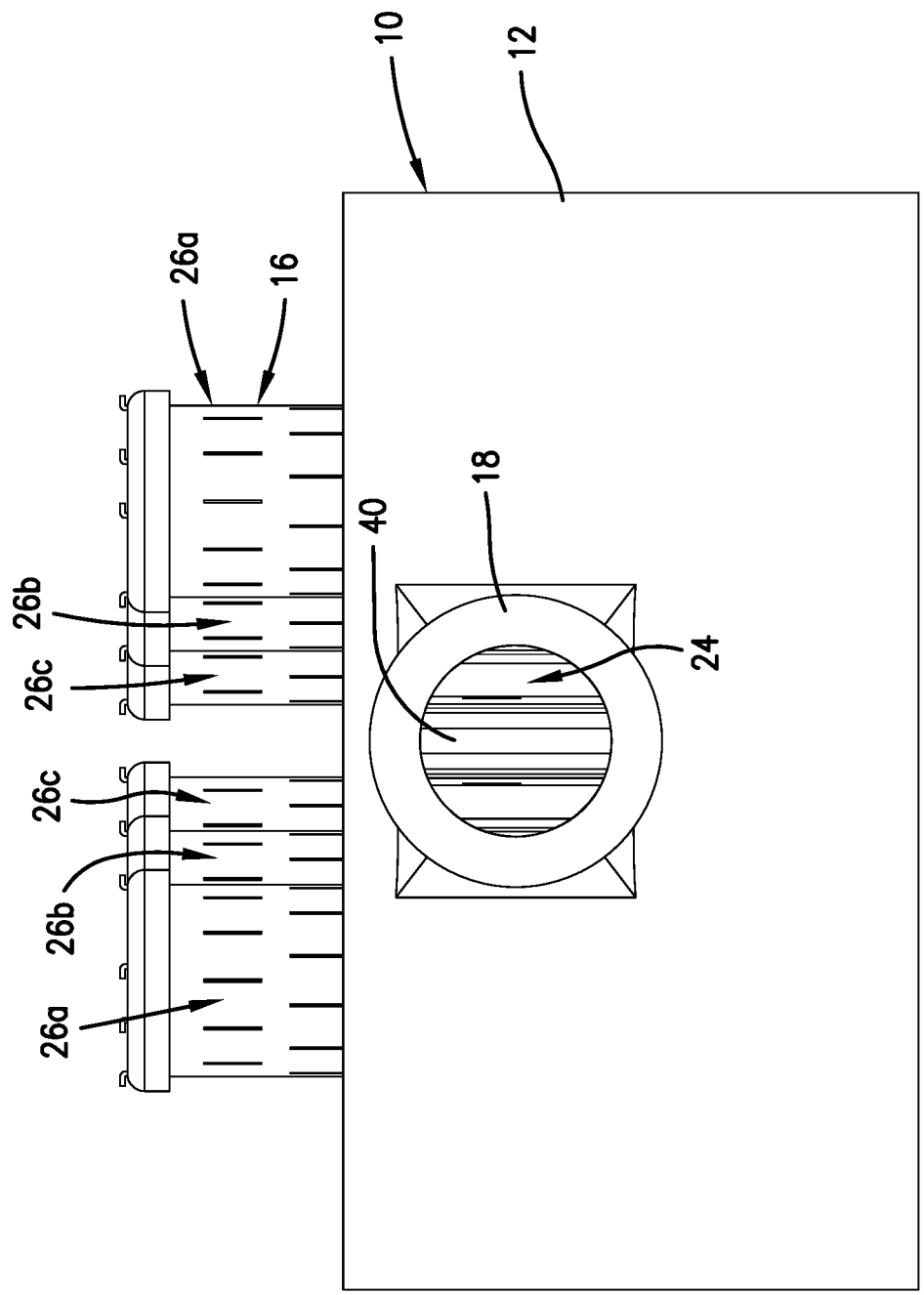
FIG. 4 is an elevation view of the portion of the vessel shown in FIGS. 2 and 3.
Figure 7:
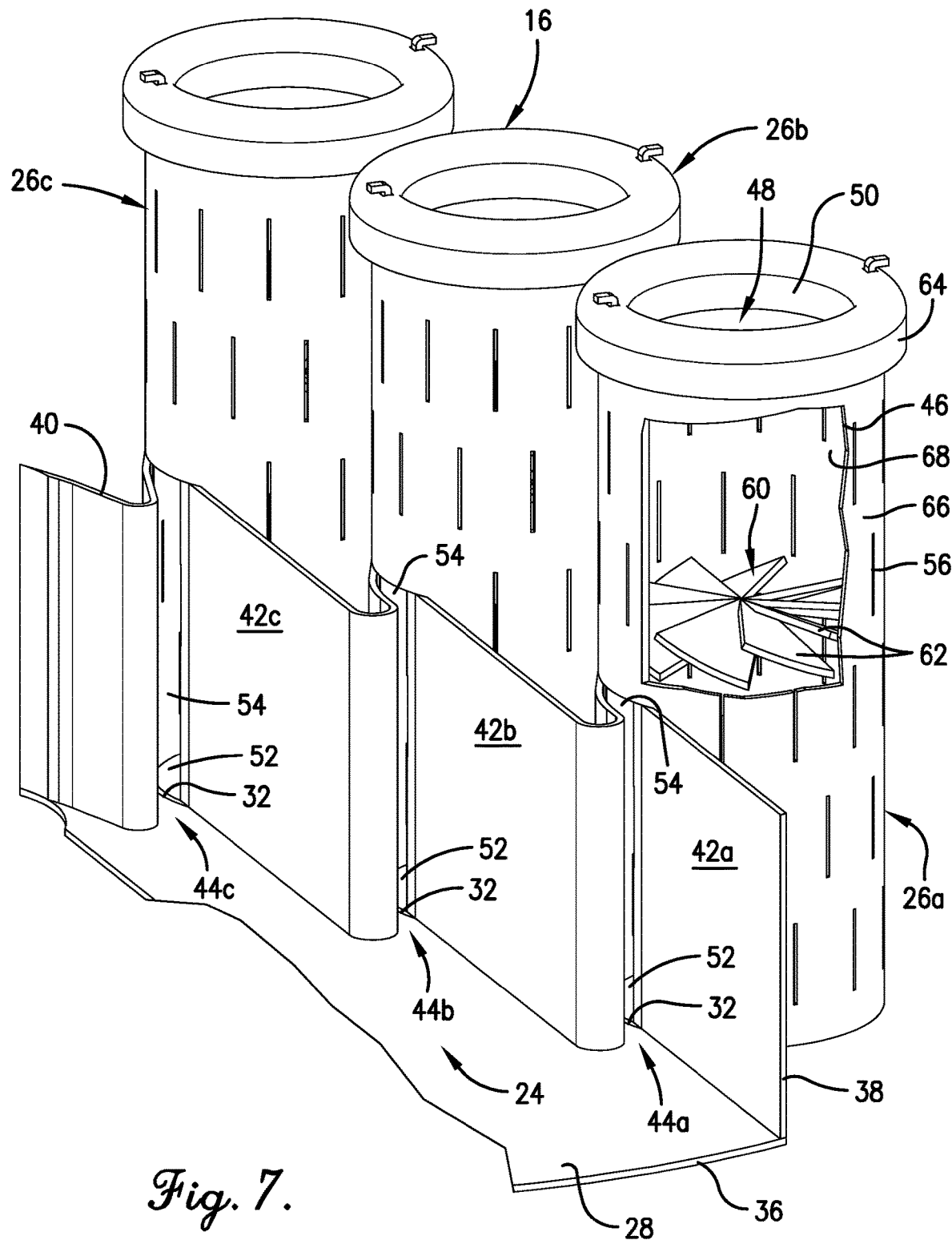
FIG. 7 is a further enlarged, fragmentary view of the inlet device shown in FIG. 6 and with a portion of a separation can broken away to show an internal swirler.

As can best be seen in FIGS. 3 and 7, each of the separation cans 26a, 26b, and 26c may include a swirler 60 that is positioned within the cylindrical wall 46 to maintain the rotational momentum of the fluid stream as it releases some of its liquid phase and rises under the influence of the gas phase within the open interior region 48. The swirler 60 may take different forms, such as radially-extending blades 62 that are angled upwardly in the rotational direction of fluid flow. In one embodiment, the swirler 60 is positioned at or slightly above an upper edge of the inlet opening 54.

The separation cans 26a, 26b, and 26c may also include a drip ring 64 that is positioned at the open upper end 50 of the open interior region 48 and extends outwardly beyond an outer surface 66 of the cylindrical wall 46 and inwardly within an inner surface 68 of the cylindrical wall 46. The drip ring 64 functions to impede continued upward momentum of the liquid phase as it flows upwardly along the outer surface 66 and the inner surface 68. The drip ring 64 may have an inverted U-shape to transition the upward momentum of the liquid phase to a downward momentum.

An alternate embodiment of the inlet device is shown in FIGS. 9-12, in which the same reference numerals preceded by the prefix "1" are used to indicate like components to those shown in FIGS. 1-8. The inlet device 116 differs from inlet device 16 in that the flow channel 124 is split to create two branches 125a and 125b and unequal numbers of separation cans 126 are positioned on opposite sides of each branch 125a and 125b. The inlet device 116 is thus able to accommodate a greater volumetric flow of the liquid stream.

The present invention is also directed to a method of separating the gas phase from the liquid phase in the fluid stream using the inlet device 16, 116. The method includes the steps of introducing the fluid stream radially into the vessel 10, 110 and the inlet device 16, 116 through the feed nozzle 18, 118 and then flowing the fluid stream within the flow channel 24, 124 from the inlet end 28, 128 to the outlet ends 32, 132. Separate portions of the fluid stream are then delivered from the outlet ends 32, 132 to the separation cans 26, 126 through the inlet openings 54, 154 in the cylindrical walls 46, 146 of the separation cans 26, 126. The tangential delivery of the fluid stream within the cylindrical walls 46, 146 causes the separate portions of the fluid stream to rotate or swirl within the open interior regions 48, 148 so that a centrifugal force that results from the swirling of the separate portions of the fluid stream causes the liquid phase in the separate portions of the fluid stream to impact against the inner surfaces 68, 168 of the cylindrical walls 46, 146 and the gas phase to separate from the liquid phase and ascend upwardly. The liquid phase is then removed from the inner surfaces 68, 168 of the cylindrical walls 46, 146 through the slots 56, 156 in the cylindrical walls 46, 146 and through the open lower ends 52, 152 of the open interior regions 48, 148. The open lower ends 46, 146 are spaced above any level of liquid that may be present beneath the inlet devices 16, 116 so that the exiting liquid may freely descend to a liquid collector or other internal device that may be present within the vessel 10, 110. The ascending gas phase is removed through the open upper ends 50, 150 of the open interior regions 48, 148 without having to first navigate downwardly to enter a center gas pipe as is required by some conventional inlet devices.

The method step of causing separate portions of the fluid stream to rotate or swirl is achieved by flowing the separate portions of the fluid stream in a tangential direction to the cylindrical walls as the separate portions of the fluid stream are delivered from the outlet ends 32, 132 of the flow channels 24, 124 through the inlet openings 54, 154 in the cylindrical walls 46, 146 and by causing the ascending fluid stream to pass through the swirler 60, 160 as some of the liquid phase is separated and the lighter fluid stream ascends within the open interior region 48, 148. The method of using the inlet devices 16 and 116 does not require that the lower ends 52, 152 of the open interior region 48, 148 be submerged within a liquid to create a static head that impedes breakthrough of the gas phase as is required by some conventional inlet devices.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. An inlet device for separating a gas phase from a liquid phase in a fluid stream when introduced radially into a vessel, said inlet device comprising:
   a flow channel having an inlet end where the fluid stream enters the flow channel and outlet ends where separate portions of the fluid stream exit the flow channel, the outlet ends being spaced from the inlet end;
   a separation can position at each of the outlet ends of the flow channel, each of the separation cans comprising:
      a cylindrical wall having an inner surface and an outer surface and forming an open interior region that is open at opposite upper and lower ends;
      an elongated inlet opening in the cylindrical wall and positioned adjacent one of the outlet ends of the flow channel to allow one of the portions of the fluid stream when it exits the outlet end of the flow channel to pass tangentially through the inlet opening in the cylindrical wall into the open interior region where it swirls within the open interior region to facilitate separation of the gas phase from the liquid phase in the fluid stream; and
      slots formed in the cylindrical wall to allow some of the liquid phase of the fluid stream when swirling within the open interior region to pass outwardly through the slots and exit the separation can while the separated gas phase flows upwardly and exits the separation can through the open upper end of the open interior region.

2. The inlet device of claim 1, including ones of said separations cans positioned along opposite sides of said flow channel.

3. The inlet device of claim 1, including dividers positioned in said flow channel for separating said fluid stream into said separate portions.

4. The inlet device of claim 1, including a swirler positioned in the open interior region in each of the separation cans.

5. The inlet device of claim 1, including a drip ring positioned at the open upper end of the open interior region and extending outwardly beyond the outer surface of the cylindrical wall of the separation can to impede an upward momentum of liquid when flowing upwardly along said outer surface.

6. The inlet device of claim 1, wherein said elongated inlet opening in the cylindrical wall of the separation can is positioned within a lower portion of the cylindrical wall.

7. The inlet device of claim 1, including tabs associated with said slots in the cylindrical wall of the separation can.

8. The inlet device of claim 1, wherein said flow channel is divided into branches and ones of said separation cans are positioned along opposite sides of each of said branches.

9. The inlet device of claim 1, wherein said flow channel is formed by an upper wall, a lower wall, and side walls that are joined together.

10. A vessel comprising a shell, an internal region defined by the shell, a radial feed nozzle in the shell, and an inlet device of claim 1 positioned in the internal region and aligned with the radial inlet.

11. The vessel of claim 10, including ones of said separations cans positioned along opposite sides of said flow channel.

12. The vessel of claim 10, including dividers positioned in said flow channel for separating said fluid stream into said separate portions.

13. The vessel of claim 10, including a swirler positioned in the open interior region in each of the separation cans.

14. The vessel of claim 10, including a drip ring positioned at the open upper end of the open interior region and extending outwardly beyond the outer surface of the cylindrical wall of the separation can to impede an upward momentum of liquid when flowing upwardly along said outer surface.

15. The vessel of claim 10, wherein said elongated inlet opening in the cylindrical wall of the separation can is positioned within a lower portion of the cylindrical wall.

16. The vessel of claim 10, wherein said flow channel is divided into branches and ones of said separation cans are positioned along opposite sides of each of said branches.

17. A method of separating a gas phase from a liquid phase in a fluid stream using an inlet device of claim 1, comprising the steps of:
flowing the fluid stream within the flow channel from the inlet end to the outlet ends;
delivering separate portions of the fluid stream from the outlet ends to the separation cans through the inlet openings in the cylindrical walls of the separation cans;
causing the separate portions of the fluid stream to swirl within the open interior regions so that a centrifugal force that results from the swirling of the separate portions of the fluid stream causes the liquid phase in the separate portions of the fluid stream to impact against the inner surfaces of the cylindrical walls and the gas phase to separate from the liquid phase and ascend upwardly;
removing the liquid phase from the inner surfaces of the cylindrical walls through the slots in the cylindrical walls and through the open lower ends of the open interior regions; and
removing the ascending gas phase through the open upper ends of the open interior regions.

18. The method of claim 17, wherein said step of causing separate portions of the fluid stream to swirl comprises flowing said separate portions of the fluid stream in a tangential direction to the cylindrical walls during said step of delivering separate portions of the fluid stream from the outlet ends through the inlet openings in the cylindrical walls.

19. The method of claim 18, wherein said step of causing separate portions of the fluid stream to swirl additionally comprises flowing the separate portions of the fluid stream through a swirler in each of the open interior regions.

20. The method of claim 18, wherein the open lower ends of the open interior regions are not submerged in liquid during said step of removing the liquid phase.

* * * * *